May 29, 1962     I. J. C. SCOTT     3,036,562
ELECTRONIC GOVERNOR
Filed Aug. 3, 1959
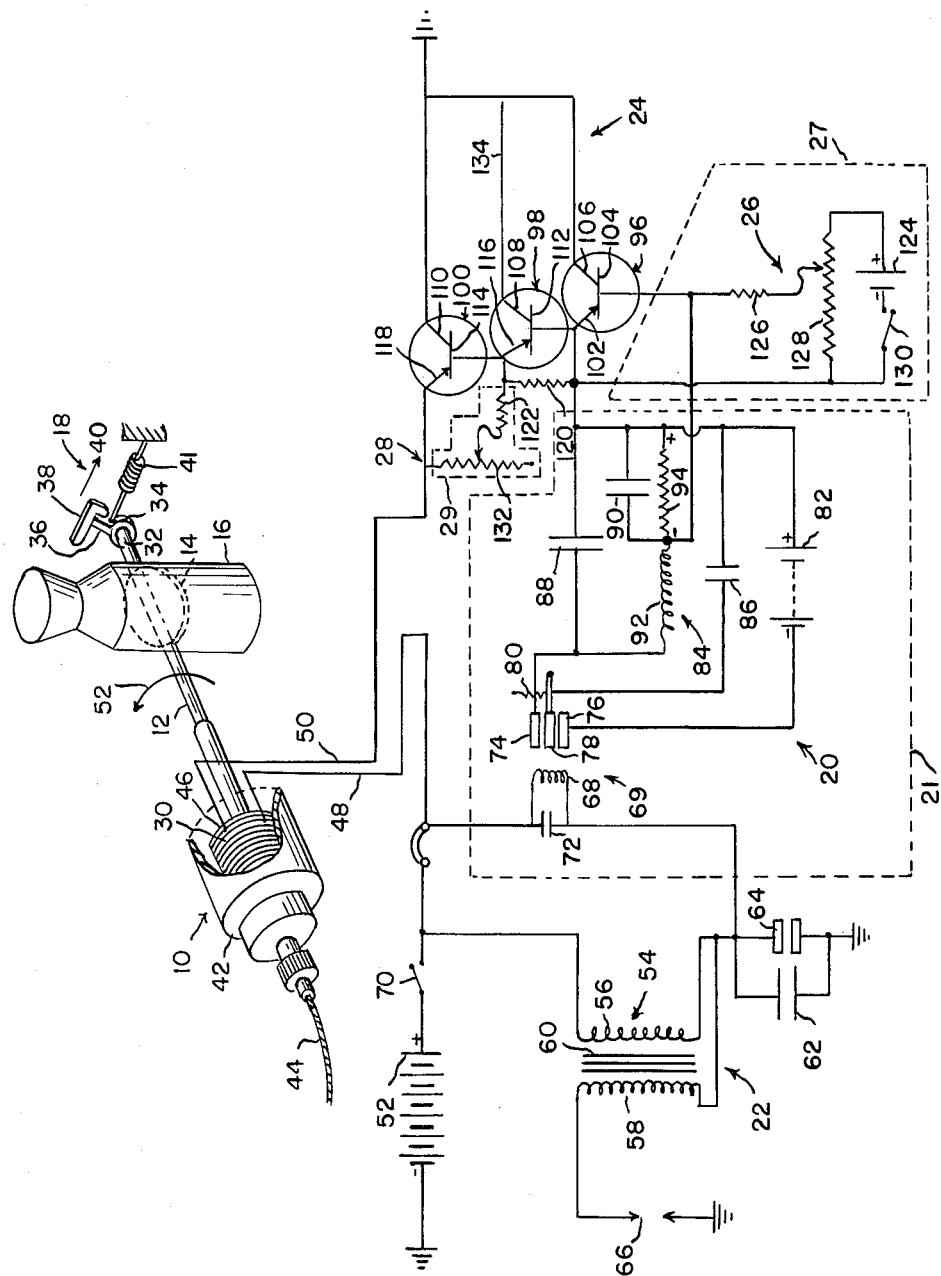
INVENTOR.
IAN J.C. SCOTT
BY *Whittemore*
*Hulbert & Belknap*
ATTORNEYS 3,036,562
ELECTRONIC GOVERNOR
Ian J. C. Scott, Madison Heights, Mich., assignor to Holley Carburetor Company, Van Dyke, Mich., a corporation of Michigan
Filed Aug. 3, 1959, Ser. No. 831,315
18 Claims. (Cl. 123—102)

The present invention relates to an electronic governor and refers more particularly to improved means for developing an electrical signal proportional to engine speed for use with an electronic governor including adjustable means for regulating the magnitude of the signal effective to produce governing of the engine speed and for regulating the amount of governing of the engine speed by a signal in excess of said regulated magnitude.

In the use of a governor to regulate the speed of an engine it is of importance that the governor operate to reduce the speed of the engine substantially immediately on the speed thereof reaching a predetermined regulation point, leaving little time for the engine to over-speed before the regulation is effective. Also it is desirable that a governor be capable of use with engines using standard distributors and other components. Furthermore it is desirable that the speed at which a governor starts governing an engine be adjustable and that it is possible to readily adjust the maximum speed at which the governor will allow the engine to run. In the past governors have often lacked one or more of these desirable features.

It is therefore one of the objects of the present invention to provide an improved electronic governor for governing the speed of an engine which may be installed on engines having the usual ignition system and which are not equipped with special distributors or other components.

Another object is to provide improved means for developing an electrical signal proportional to the speed of an engine.

Another object is to provide means for regulating the magnitude at which an electrical signal which is proportional to engine speed is effective to producing engine governing when said signal is used to govern said engine speed.

Another object is to provide means for regulating the amount of governing action produced by an electrical signal which is proportional to engine speed when said signal is used in governing said engine speed.

More specifically it is an object to provide an electronic governor for governing the speed of an engine including a magnetic clutch operable on energization thereof to limit the opening of the engine throttle valve, improved means for developing an electrical signal proportional to the speed of the engine to energize said magnetic clutch, means producing a variable electrical signal connected in opposition to said developed signal to prevent energization of said clutch until a predetermined engine speed is reached, and means for amplifying said developed signal by a variable amount to provide predetermined governing action for a predetermined developed signal.

It is also an object to provide an improved electronic governor for governing the speed of an engine which is simple in operation, economical to manufacture and efficient in use.

Other objects and features of the invention will become apparent as the description proceeds, especially when taken in conjunction with the accompanying drawings, wherein the FIGURE is a partly schematic and partly diagrammatic representation of the electronic governor of the invention.

With reference to the figure a specific embodiment of the electronic governor of the invention will now be described.

As shown the governor of the invention comprises a magnetic clutch 10 attached to one end of a shaft 12 on which is mounted a butterfly throttle control valve 14 positioned within the Venturi passage 16 of an engine (not shown), the speed of which is to be governed. The governing mechanism includes means on the other end of shaft 12, generally indicated 18, for biasing shaft 12 to rotate in a direction to open the butterfly valve 14. According to the invention the electronic governor of the invention also includes means 20 shown enclosed within the dotted line 21 for developing an electrical signal proportional to the speed of an engine which is operable in conjunction with the usual vehicle ignition system, generally indicated 22, an amplification means generally indicated 24, for amplifying the signal developed in signal developing means 20, adjustable means 26 within dotted line 27 for regulating the signal value at which the signal developed by signal developing means 20 is effective to cause governing action of the engine speed, and other adjustable means 28 within dotted line 29 for determining the amount of governing action which will be produced by a given signal developed by signal developing means 20.

With the above indicated components arranged as shown in the figure the magnetic clutch 10 is effective on receiving the signal developed by the signal developing means 20 and amplified through the amplifying means 24 to produce a torque on shaft 12 at an engine speed determined by the setting of the regulating means 26 and to cause rotation of the shaft 12 in a direction tending to close the butterfly valve 14 in opposition to means 18 at an engine speed determined by the setting of the means for determining the amount of governing action 28 for a given signal developed by signal developing means 20.

More specifically the means for producing rotation of the butterfly valve 14 in accordance with a governing signal which is proportional to engine speed includes the magnetic clutch 10 operable to cause rotation of a shaft 12 attached thereto on the passing of a current through the field coil 30 thereof as will later be explained. The butterfly valve 14 is secured to the shaft 12 for rotation therewith and positioned within the fuel passage or Venturi 16 to the engine the speed of which is to be governed. The valve 14 is operable in the usual manner on rotation of shaft 12 to permit more or less fuel to flow into the engine associated therewith to increase or decrease the speed of the engine. Attached to the end 32 of the shaft 12 there is provided a disc 34 having a single tooth 36 extending therefrom radially with respect to the shaft 12. The tooth 36 is operatively associated with a stop 38 which is movable along a line indicated by arrow 40 to permit rotation of the disc 34 and tooth 36 and therefore shaft 12 under bias from spring 41 to rotate the valve 14 reciprocally in a direction to increase engine speed. Stop 38 may be operated by convenient means such as the usual throttle control (not shown) associated with the engine to be governed.

The magnetic clutch 10 as illustrated is the type common in the clutch art wherein one side slips relative to the other in normal operation. During operation of the clutch, the side 42 thereof may be connected to a rotating portion of the engine, as by the flexible cable 44, in order to obtain the required power to actuate the throttle valve 14. However, it is apparent that the clutch mechanism does not need to rotate in accordance with engine speed; accordingly, any suitable drive means such as an electric motor could be employed to supply the actuating power to the side 42 of the clutch 10. The only requirement is that the side 42 be rotated whenever the engine is in operation. The coupling of the rotating part 42 and the part 46 of the clutch shown is provided by feeding a current through the field coil 30 thereof from conductors 48 and 50 as shown. On feeding of the electrical current through coil 30 on side 46 of clutch 10 an electrical field will be set up about coil 30 proportional to the current flow in the coil which due to the cutting of flux lines by the rotating member 42 will cause member 46 to tend to follow the rotation of member 42. A slipping or a drag between the members 42 and 46 occurs with such an arrangement and if the shaft 12 is held against rotation a torque is applied thereto. The direction in which the shaft 12 tends to rotate with such torque applied thereto may be chosen with the other complements of the clutch fixed in relation thereto by the direction of rotation of the part 42 thereof and hence by the manner of coupling of the flexible shaft 44 to a rotating portion of the engine. It is essential however to the operation of the governing device as illustrated that the clutch 10 be so connected that the shaft 12 will tend to rotate in the direction indicated by arrow 52 due to current flow in coil 30.

Although the clutch device 10 as disclosed is of the induction type, it is apparent that other similar types of clutches are adaptable to the invention; for example, a magnetic particle clutch could be employed if such were desired.

From the above arrangement it will be seen that the amount of torque applied to the shaft 12 will depend on the magnitude of the electrical signal applied through the clutch coil 30. Furthermore it will be seen that the shaft 12 will rotate in a direction opposite to the arrow 52 to increase the speed of the engine when it is allowed to do so by movement of the stop 38 in the direction indicated by the arrow 40 until the governing signal through the coil 30 is of sufficient value that coupling between the parts 42 and 46 of the clutch 10 is sufficient to apply enough torque on shaft 12 in the direction of arrow 52 to overcome the tendency of the shaft 12 to rotate in the opposite direction due to the bias of the spring 41 at which time the rotation of the throttle valve 14 will stop. Further increase in engine speed will cause the throttle valve 14 to rotate in a direction tending to decrease the engine speed whereby the speed of the engine is limited to a predetermined maximum.

The means 20 for developing an electrical signal proportional to engine speed which may be amplified by amplifying means 24 and fed through the clutch coil 30 to cause governing of the speed of the engine as illustrated is connected to the usual ignition system of a vehicle.

As is well known the vehicle ignition system includes a battery 52, an ignition coil 54 having a primary winding 56, a secondary winding 58 and a saturable core 60, a condenser 62 and ignition points 64 which operates to produce a spark across a spark gap, such as indicated at 66 which may be a spark plug to cause firing of engine fuel. Switch 70 is the usual ignition switch.

In the well known operation of such a system a circuit to ground through the primary coil 56 from the battery 52 is alternately open and closed by means of a cam wheel (not shown) opening and closing the contact points 64. Thus electrical energy is stored in the ignition coil primary during the closing of the points 64 which on dissipation when the points 64 are opened induces a surge of current in the secondary winding 58 of the ignition coil 54 effective to cause a spark across the spark gap 66.

Thus it can be seen that by connecting a coil 68 of a relay 69 in parallel with the primary winding of the ignition coil 56 it is possible to develop a signal thereacross which will pulsate in accordance with the opening and closing of the points 64 which as is well understood is accomplished in accordance with engine speed in the usual ignition system. The capacitors 62 and 72 are provided across the ignition points 64 and the relay coil 68 as shown to eliminate sparking across the ignition points on opening thereof.

The means 20 for developing an electrical signal proportional to engine speed as shown in the figure includes the stationary relay contacts 74, and 76, the movable relay contact 78 biased by spring 80 into contact with the stationary contact 74, a source of electrical energy such as battery 82, a capacitor 86 for developing a varying voltage and filter means generally indicated 84, comprising capacitors 88 and 90, inductor 92 and resistor 94. The relay 69 is operable on the closing of points 64 and the energizing of coil 68 thereof to cause contacts 76 and 78 to engage whereby the battery 82 is caused to charge capacitor 86. On the opening of the points 64 and the deenergizing of relay coil 68 the spring 80 biases the movable contact 78 of the relay 69 into engagement with the contact 74 thereof whereby the capacitor 86 previously charged by battery 82 is allowed to discharge through the filter means 84.

Thus due to the charge built up on the capacitors 88 and 90 during the discharging of the capacitor 86 which is discharged therefrom through the inductor 92 and the resistor 94 during charging of the capacitor 86 and the current produced in the resistor 94 during the discharging of the capacitor 86, it will be readily understood that a direct current signal will be produced across the resistor 94 which will be proportional to the frequency of oscillation of the movable contact 78 of relay 69 which in turn will be a function of the rate of opening and closing of contact points 64 which is controlled by engine speed. It can be seen then that with the system thus far described it is possible to develop a direct current signal which is directly proportional to the speed of an engine and which is substantially immediately responsive thereto.

As shown in the figure the amplifying means 24 includes the transistors 96, 98 and 100 arranged in an amplifying circuit as shown, such that a signal impressed across the emitter 102 and the base 104 of the transistor 96 will cause an amplified current to flow through the clutch coil 30 from the battery 52 through the transistors and back to the grounded side of the battery 52. As shown to accomplish such amplification the collectors 106, 108 and 110 of the transistors 96, 98 and 100 respectively are connected to ground. The base 112 of the transistor 98 is connected to the emitter 102 of the transistor 96, the base 114 of the transistor 100 is connected to the emitter 116 of the transistor 98, and the emitter 118 of the transistor 100 is connected to the coil 30 as shown. Also the resistor 120 is provided between emitter 116 and the base 112 of the transistor 98 to prevent short circuiting thereof and resistor 122 is provided between the emitter 118 and the base 114 of the transistor 100 for the same reason.

The load resistor 94 is connected at opposite ends to the base 104 and the emitter 102 of the transistor 96 as shown. A potential difference is thus created between the emitter 102 and the base 104 of transistor 96 which is proportional to the current flowing in the resistor 94 which as previously shown is proportional to the speed of the engine. The potential difference between the emitter 102 and base 104 will cause current to flow in the emitter base circuit of the transistor 96 producing a much larger current flow in the emitter collector circuit thereof which will also be proportional to the engine speed.

The current flow through the transistor 96 will cause the voltage on the base 112 of the transistor 98 to change to the extent that current will be permitted to flow in the emitter base circuit thereof producing an even greater current flow in the emitter collector circuit of the transistor 98 in a manner similar to the production of current flow in the emitter collector circuit of the transistor 96 just described. Likewise current flow through the transistor 98 will create a difference in potential on the base of the transistor 100 to create a current flow between the emitter and base thereof and an amplified current flow between the emitter collector of the transistor 100.

The total amplified current flow through the transistors will in the usual manner flow from the battery 52 through clutch coil 30 to the transistors. Thus a very small potential drop across the resistor 94 proportional to the speed of an engine will produce a relatively large current flow through the clutch coil 30 which is similarly proportional to the speed of the engine.

It will also be noted that means are provided in the amplifying circuit to prevent amplification of a signal present on resistor 94 until the signal has reached a variable minimum whereby the speed at which the governing action of the electronic governor will be effective may be controlled. Also means are provided in conjunction with the amplifying means 24 to vary the amount of amplification of any signal applied thereto so that the speed at which the governor will allow the engine to operate and the spread of the governor may be controlled.

The means 26 by which it is possible to prevent amplification of a signal present on resistor 94 until the signal has reached a predetermined minimum includes a source of electrical energy such as battery 124 and resistor 126 in conjunction with the variable resistor 128 and switch 130. On closing of the switch 130 the battery 124 creates a potential across the variable resistor 128, any desired value of which may be impressed across the emitter base circuit of the transistor 96 on movement of the variable connection of the resistor 128. It will be noted that such potential is applied across the emitter base circuit of the transistor 96 in a direction opposite to that applied thereto by the voltage drop across the resistor 94 and in a direction to cause the transistor 96 not to conduct. Therefore before any current can be amplified by the transistor 96 or the other transistors in the amplifying means 24 it is necessary that the voltage developed across the resistor 94 be larger than that tapped off of the variable resistor 128. Thus by setting the movable arm of resistor 128 in a desired position it is possible to prevent any governing action by the electronic governor until the engine has reached a sufficient speed to produce the required voltage across the resistor 94.

The means 28 for regulating the amount of amplification of the amplifying means 24 which will determine the amount of governing action which a given signal developed by signal developing means 20 will produce includes a variable resistor 132 connected between the emitter and base of the transistor 100. The resistance 132 may be varied to provide greater or less potential difference between the base 114 and emitter 118 of the transistor 100 to cause greater or less amplification of a signal applied thereto, thus reducing or increasing the total amplification of the amplification means 24 depending on the setting of the variable arm of the resistor 132.

In over-all operation of the electronic governor described above the movable arm of the resistor 128, which in this embodiment is employed as a potentiometer, is set to a calibrated speed at which it is desired to initiate governing action of the engine to which the electronic governor is attached. The variable arm of the resistor 132 is set to determine spread of the governor or the speed above which the electronic governor as above described will not allow an engine governed thereby to operate. The ignition switch 70 of the vehicle may then be closed. The switch 130 in the regulating means 26 which may be a relay operated switch connected with the vehicle ignition switch is also closed and the vehicle engine is started.

In the manner above described pulses of current are then created in the relay coil 68 by the opening and closing of the ignition points 64 to produce oscillation of the fixed contact 78 of the relay 69 which is proportional to engine speed which are used to charge capacitor 86. As indicated previously capacitor 86 is discharged through the filter means 84 creating a signal on the resistor 94 which is proportional to the speed of the engine. On the signal across the resistor 94 becoming larger than the voltage from battery 124 which is impressed across the emitter base circuit of the transistor 96 through the resistor 128 the amplifying means 24 will be caused to conduct creating a current through the clutch coil 30 which will also be proportional to the engine speed. The degree of amplification of the signal reaching coil 30 will be determined by the setting of the movable arm on the resistor 132 as previously explained.

The signal in the clutch coil 30 will cause the portion 46 of the magnetic clutch 10 to tend to follow the rotations of the part 42 of the clutch 10 which rotates in proportion to the engine speed as previously explained. The tendency of the part 46 of the clutch 10 to follow the part 42 will create a torque in the shaft 12 which will tend to rotate the shaft 12 in the direction of the arrow 52 in opposition to the bias applied thereto by the spring 41 on movement of stop 38 in the direction of arrow 40 and which will tend to close the throttle valve 14 attached to the shaft 12. On the signal through the clutch coil becoming sufficiently large the shaft 12 will no longer rotate in a direction opposite to the arrow 52 on further movement of the stop 38 in the direction of the arrow 40 but will become stationary with the throttle valve 14 in a position to produce an engine speed which is the maximum desirable speed thereof. Further engine speed will cause the shaft 12 to rotate in the direction of arrow 52 to close the valve 14 and reduce the engine speed. Thus the speed of an engine may be maintained within desired variable limits.

If desired the spread control variable resistor 132 may be positioned in connector 134 between the collector terminal 108 of transistor 98 and ground and the bleeder resistor 122 connected directly to the emitter terminal 118 of transistor 100. The effect of varying the resistance 132 in either position will be to vary the spread of the governor which may be defined as the number of engine revolutions per minute from the point at which the governor first starts to close the throttle valve 14 to the point where the engine is operating as fast as the governor will allow i.e. at no load.

The drawing and the foregoing specification constitute a description of the improved electronic governor in such full, clear, concise and exact terms as to enable any person skilled in the art to practice the invention, the scope of which is indicated by the appended claims.

What I claim as my invention is:

1. In an electronic engine speed governor, means operatively associated with the engine for developing an electrical signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal is is initiated is determined, and means for determining the degree of amplification of said signal when it is larger than said predetermined magnitude whereby the speed at which the engine is allowed to operate when it is governed by said signal is controlled.

2. In an electronic engine speed governor, means operatively associated with the engine for developing an electrical signal proportional to the speed of the engine for use in governing the engine, means for amplifying said signal, adjustable means operatively associated with said amplifying means for preventing the amplification of the portion of said signal which is below a corresponding predetermined magnitude whereby the speed of the engine at which governing thereof it initiated is determined, and means for determining the degree of amplification of said signal when it is larger than said predetermined magnitude whereby the speed at which the engine is allowed to operate when it is governed by said signal is controlled.

3. In an electronic engine speed governor, means operatively associated with the engine for developing an electrical signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal is initiated is determined, and means for variably selecting the degree of amplification of said signal when it is larger than said predetermined magnitude whereby the speed at which the engine is allowed to operate when it is governed by said signal is controlled.

4. In an electronic engine speed governor, means operatively associated with the engine for developing an electrical signal proportional to the speed of the engine, comprising a capacitor, a source of electrical energy, filter means including a load resistor, means for alternately connecting the capacitor across said source of electrical energy and said filter means at a frequency determined by engine speed whereby said capacitor is alternately charged by said source of electrical energy and discharged through said filter means to produce a signal proportional to engine speed on said resistor, means for amplifying said signal, means operatively associated with said amplifying means for preventing the amplification of the portion of said signal which is below a predetermined magnitude whereby the speed of the engine at which governing thereof is initiated is determined, and means for determining the degree of amplification of said signal when it is larger than said predetermined magnitude whereby the maximum speed at which the engine will operate is controlled.

5. In an electronic engine speed governor, means operatively associated with the engine for developing an electrical signal proportional to the speed of the engine, comprising a capacitor, a first source of electrical energy for use in governing the engine, filter means including a load resistor, a relay the actuating coil of which is connected in the ignition circuit of said engine in series between a second source of electrical energy and the ignition points for alternately connecting the capacitor across said first source of electrical energy and said filter means periodically at a frequency determined by engine speed whereby said capacitor is alternately charged by said first source of electrical energy and discharged through said filter means to produce a signal proportional to engine speed on said resistor, means for amplifying said signal, means operatively associated with said amplifying means for preventing the amplification of the portion of said signal which is below a predetermined magnitude whereby the speed of the engine at which governing due to said signal is initiated is determined, and means for determining the degree of amplification of said signal when it is larger than said predetermined magnitude whereby the speed at which the engine is allowed to operate when it is governed by said signal is controlled.

6. In an electronic engine speed governor, means operatively associated with the engine for developing an electrical signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal in initiated is determined, including a source of electrical energy, a resistor connected across said source of electrical energy and means for applying variable portions of the voltage developed across said resistor as a bias to said amplifying means in opposition to said signal, and means for determining the degree of amplification of said signal when it is larger than said predetermined magnitude whereby the speed at which the engine is allowed to operate when it is governed by said signal is controlled.

7. In an electronic engine speed governor, means operatively associated with the engine for developing an electrical signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal is initiated is determined, and means for determining the degree of amplification of said signal when it is larger than said predetermined magnitude whereby the speed at which the engine is allowed to operate when it is governed by said signal is controlled, including a variable bias resistor in circuit with said amplification means settable to control the amplification factor thereof.

8. In an electronic engine speed governor, means operatively associated with the engine for developing an electrical signal proportional to the speed of the engine for use in governing the engine, comprising a capacitor, a source of electrical energy, filter means including a load resistor, means for alternately connecting the capacitor across said source of electrical energy and said filter means periodically at a frequency determined by engine speed whereby said capacitor is alternately charged by said source of electrical energy and discharged through said filter means to produce a signal proportional to engine speed on said resistor.

9. In an electronic engine speed governor, means operatively associated with the engine for developing an electrical signal proportional to the speed of the engine for use in governing the engine, comprising a capacitor, a first source of electrical energy, filter means including a load resistor, a relay the actuating coil of which is connected in the ignition circuit of said engine in series between a second source of electrical energy and the ignition points for alternately connecting the capacitor across said first source of electrical energy and said filter means periodically at a frequency determined by engine speed whereby said capacitor is alternately charged by said first source of electrical energy and discharged through said filter means to produce a signal proportional to engine speed on said resistor.

10. In an electronic engine speed governor, means operatively associated with the engine for developing an electrical signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal is initiated is determined, including a source of electrical energy, a resistor connected across said source of electrical energy and means for applying variable portions of the voltage developed across said resistor as a bias to said amplifying means in opposition to said signal.

11. In an electronic engine speed governor, means operatively associated with the engine for developing an electrical signal proportional to the speed of the engine for use in governing the engine, comprising a capacitor, a first source of electrical energy, filter means including a load resistor, a relay the actuating coil of which is connected in the ignition circuit of said engine in series between a second source of electrical energy and the ignition points for alternately connecting the capacitor across said first source of electrical energy and said filter means periodically at a frequency determined by engine speed whereby said capacitor is alternately charged by said first source of electrical energy and discharged through said filter means to produce a signal proportional to engine speed on said resistor, means for amplifying said signal, means operatively associated with said amplifying means for preventing the amplification of the portion of said signal which is below a predetermined magnitude whereby the speed of the engine at which governing thereof is initiated is determined, including a source of electrical energy, a resistor connected across said source of electrical energy and means for applying variable portions of the voltage developed across said resistor as a bias to said amplifying means in opposition to said signal, and means for determining the degree of amplification of said signal when it is larger than said predetermined magnitude whereby the speed at which the engine is allowed to operate when it is governed by said signal is controlled, including a variable bias resistor in circuit with said amplification means settable to control the amplification factor thereof.

12. In an electronic engine speed governor of the type wherein a magnetic clutch is connected to one end of a throttle valve carrying shaft for rotating said valve in a direction to decrease engine speed an amount depending on the magnitude of an electrical signal which is proportional to engine speed when said signal is applied to said clutch and wherein resilient means is connected to the other end of said shaft responsive to accelerator movement to rotate said valve in a direction to increase engine speed, means operatively associated with the engine for developing an electrical signal proportional to the speed of the engine for application to said clutch, means for amplifying said signal, means operatively associated with said amplifying means for preventing the amplification of the portion of said signal which is below a predetermined magnitude whereby the speed of the engine at which governing due to said signal is initiated is determined, and means for determining the degree of amplification of said signal when it is larger than said predetermined magnitude whereby the speed at which the engine is allowed to operate when it is governed by said signal is controlled.

13. An electronic engine speed governor, comprising a rotatable shaft, an engine throttle valve rotatable to increase or decrease engine speed secured to said shaft for rotation therewith, means attached to one end of said shaft operable in response to engine accelerator movement to rotate said shaft in a direction to open said throttle valve and increase said engine speed, electrical signal responsive means attached to the other end of said shaft operable in response to a signal passing therethrough to rotate said shaft in a direction to close said throttle valve and decrease said engine speed, means operatively associated with the engine for developing an electrical signal proportional to the speed of the engine for use in governing the engine, means for amplifying said signal and passing it through said signal responsive means, means operatively associated with said amplifying means for preventing the amplification of the portion of said signal which is below a predetermined magnitude whereby the speed of the engine at which governing due to said signal is initiated is determined, and means for determining the degree of amplification of said signal when it is larger than said predetermined magnitude whereby the speed at which the engine is allowed to operate when it is governed by said signal is controlled.

14. In an electronic engine speed governor, means operatively associated with the engine for developing an electrical signal proportional to the speed of the engine for use in governing the engine, means for amplifying said signal, means operatively associated with said amplifying means for preventing the amplification of a portion of said signal whereby the speed of the engine at which governing due to said signal is initiated is determined, and means for selecting the degree of amplification of said signal whereby the speed at which the engine is allowed to operate when it is governed by said signal is controlled.

15. In an engine speed governor, means operatively associated with the engine for developing a signal proportional to the speed of the engine for use in governing the engine, means for amplifying said signal, means operatively associated with said amplifying means for preventing the amplification of the portion of said signal which is below a predetermined magnitude whereby the speed of the engine at which governing due to said signal is initiated is determined, and means for selecting the degree of amplification of said signal when it is larger than said predetermined magnitude whereby the speed at which the engine is allowed to operate when it is governed by said signal is controlled.

16. In a governor, means for developing a signal proportional to a parameter for use in governing the parameter, means for amplifying said signal, means operatively associated with said amplifying means for preventing the amplification of a portion of said signal whereby the magnitude of the parameter at which governing due to said signal is initiated is determined, and means for selecting the degree of amplification of said signal whereby the value of the parameter when it is governed by said signal is controlled.

17. In an electronic engine speed governor, means operatively associated with the engine for developing an electrical signal proportional to the speed of the engine for use in governing the engine at speeds above a predetermined speed, means operably associated with the signal developing means for selectively establishing said predetermined speed, and adjustable means for amplifying said signal a selected amount when said speed is above said predetermined speed whereby the speed at which the engine is allowed to operate when it is governed by said signal is controlled.

18. In a governor, means for developing a signal proportional to a parameter to be governed at parameter values above a predetermined parameter value, means operably associated with the signal developing means for selectively establishing said predetermined parameter value, and adjustable means for amplifying said signal a selected amount when said parameter is above said predetermined value.

References Cited in the file of this patent

UNITED STATES PATENTS

| | | |
|---|---|---|
| 2,469,779 | Norwalk | May 10, 1949 |
| 2,516,828 | Reggio | July 25, 1950 |
| 2,586,397 | Tuttle | Feb. 19, 1952 |
| 2,685,871 | Block | Aug. 10, 1954 |
| 2,829,662 | Carey | Apr. 8, 1958 |
| 2,842,108 | Sanders | July 8, 1958 |
| 2,908,264 | Kerr | Oct. 13, 1959 |